US012493707B2

(12) United States Patent
Murakami et al.

(10) Patent No.: US 12,493,707 B2
(45) Date of Patent: Dec. 9, 2025

(54) DEVICE MANAGEMENT SYSTEM AND COMPUTING SYSTEM THAT SET RATIO AT WHICH ACCESS RESTRICTION IS EXECUTED ON DATABASE

(71) Applicant: KYOCERA Document Solutions Inc., Osaka (JP)

(72) Inventors: Takashi Murakami, Osaka (JP); Satoshi Imai, Osaka (JP); Hisakazu Nishiyama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 211 days.

(21) Appl. No.: 18/470,411

(22) Filed: Sep. 19, 2023

(65) Prior Publication Data

US 2024/0095388 A1 Mar. 21, 2024

(30) Foreign Application Priority Data

Sep. 20, 2022 (JP) .................................. 2022-149012

(51) Int. Cl.
*G06F 21/62* (2013.01)

(52) U.S. Cl.
CPC .. *G06F 21/6218* (2013.01); *G06F 2221/2135* (2013.01)

(58) Field of Classification Search
CPC ......... G06F 21/6218; G06F 2221/2135; G06F 21/62
See application file for complete search history.

(56) References Cited

U.S. PATENT DOCUMENTS

| 2002/0167920 | A1* | 11/2002 | Miyazaki | .............. | H04W 28/02 |
| | | | | | 370/282 |
| 2004/0184066 | A1 | 9/2004 | Urabe | | |
| 2010/0049783 | A1* | 2/2010 | Ryman | .................... | H04L 67/14 |
| | | | | | 709/202 |
| 2022/0343109 | A1* | 10/2022 | Haile | ....................... | G06N 7/01 |

FOREIGN PATENT DOCUMENTS

JP 4638131 B2 2/2011

* cited by examiner

*Primary Examiner* — Quazi Farooqui
(74) *Attorney, Agent, or Firm* — Alleman Hall & Tuttle LLP

(57) ABSTRACT

A device management system includes a database and a request acceptance portion which accepts a connection request from a device. The connection request is a request for causing the request acceptance portion to execute access to the database. When the connection request is accepted from the device, the request acceptance portion sets a restriction rate according to a load amount of the database and selectively executes, by a ratio corresponding to the restriction rate, processing of permitting access to the database and processing of not permitting access to the database and notifying the device of an error.

3 Claims, 7 Drawing Sheets

| | |
|---|---|
| FIRST LOWER LIMIT VALUE (L1) | 40% |
| SECOND LOWER LIMIT VALUE (L2) | 80% |
| FIRST COEFFICIENT (K1) | 0.5 |
| SECOND COEFFICIENT (K2) | 0.7 |
| FIRST CONSTANT (C1) | 5% |
| SECOND CONSTANT (C2) | 10% |

DEVICE MANAGEMENT SYSTEM AND COMPUTING SYSTEM THAT SET RATIO AT WHICH ACCESS RESTRICTION IS EXECUTED ON DATABASE

INCORPORATION BY REFERENCE

This application is based upon and claims the benefit of priority from the corresponding Japanese Patent Application No. 2022-149012 filed on Sep. 20, 2022, the entire contents of which are incorporated herein by reference.

BACKGROUND

The present disclosure relates to a device management system which manages a device, and a computing system.

Conventionally, a device management system which manages a device has been known.

SUMMARY

A device management system according to the present disclosure is a system which manages a device. The device management system includes a database and a request acceptance portion. The request acceptance portion accepts a connection request from the device. The connection request is a request for causing the request acceptance portion to execute access to the database. When the connection request is accepted from the device, the request acceptance portion sets a restriction rate according to a load amount of the database and selectively executes, by a ratio corresponding to the restriction rate, processing of permitting access to the database and processing of not permitting access to the database and notifying the device of an error.

The device management system may include a load amount acquisition portion. The load amount acquisition portion repetitively acquires the load amount from the database at a timing that does not depend on a timing at which the request acceptance portion accepts the connection request from the device, to accumulate a plurality of sample load amounts. In this case, the request acceptance portion sets the restriction rate according to the plurality of sample load amounts.

The request acceptance portion may specify a most-belonging range where the plurality of sample load amounts belong most among a plurality of specific ranges which are each a range of the load amount, and set the restriction rate according to a latest one of the plurality of sample load amounts belonging to the most-belonging range.

A computing system according to the present disclosure includes the device and the device management system which manages the device. The device retransmits the connection request to the request acceptance portion upon being notified of the error by the request acceptance portion.

The device may randomly set a standby time required before the connection request is retransmitted since the notification of the error.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the drawings.

First, a configuration of a computing system 10 according to one embodiment of the present disclosure will be described.

Figure 1:
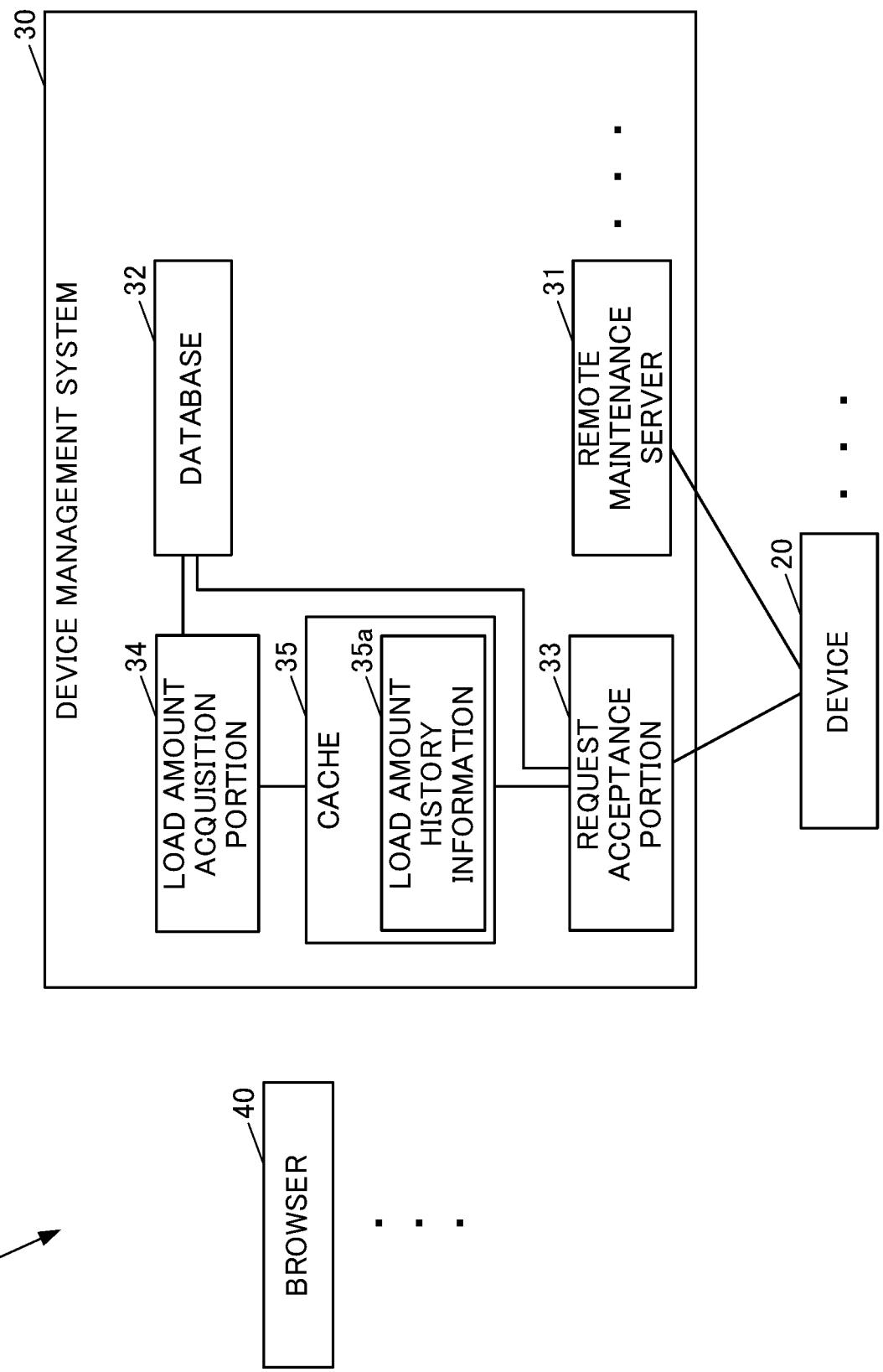
FIG. 1 is a block diagram of a system according to an embodiment of the present disclosure.

FIG. 1 is a block diagram showing the computing system 10 according to the present embodiment.

As shown in FIG. 1, the computing system 10 according to the present embodiment includes at least one device 20. For example, the computing system 10 can include one million devices 20 having similar functions.

The device 20 is, for example, an image forming apparatus such as an MFP (Multifunction Peripheral) and a printer. In the computing system 10, the device 20 is connected to a network such as a LAN (Local Area Network) that is managed by an end user of the device 20.

The computing system 10 includes a device management system 30 which remotely manages the device 20. The device management system 30 can be used by, for example, users such as a sales company, a sales outlet, and an end user of the device 20.

The device management system 30 is a system for executing, for example, processing of providing various types of information of the device 20 to the user or various types of setting processing with respect to the device 20. The various types of setting processing include an update of firmware of the device 20, and the like.

The device management system 30 is realized by a computer executing programs. The device management system 30 is realized by at least one computer. The device management system 30 is realized by, for example, cloud computing such as Microsoft Azure (registered trademark).

The device management system 30 includes a remote maintenance server 31 which executes remote maintenance on the device 20. The device management system 30 includes at least one remote maintenance server 31.

For example, the remote maintenance includes rebooting the device 20, acquiring specific information of the device 20 from the device 20, and the like. The specific information includes toner information, counter information on the number of printing times, error information, and the like.

The device management system 30 includes a database 32 which stores various types of information. For example, the database 32 retains correspondence relationship data representing a correspondence relationship between the device 20 managed by the device management system 30 and the remote maintenance server 31. The device 20 is capable of accessing the remote maintenance server 31 associated therewith by the correspondence relationship data.

Incidentally, in a conventional management system which manages the device 20, when requests to access the database 32 are accepted from many devices 20 within a short time, the number of accesses to the database 32 increases to thus increase a load of the database 32.

Meanwhile, the device management system 30 has a configuration for reducing the load of the database 32.

The device management system 30 includes a request acceptance portion 33 that is an application that accepts a request from the device 20.

Figures 5, 6:
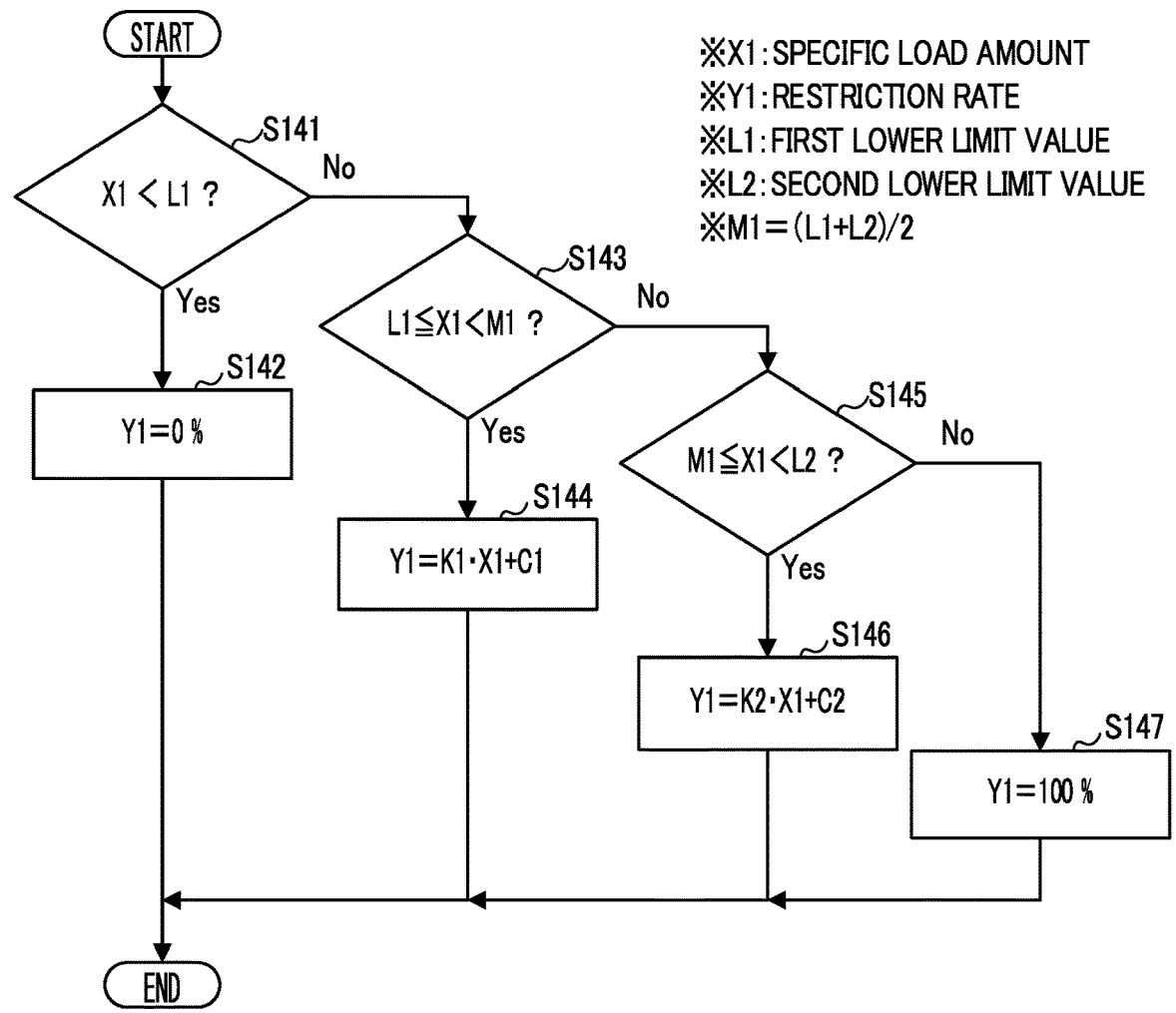
FIG. 5 is a diagram showing an example of values of respective parameters that are used when executing restriction rate setting processing shown in FIG. 4.
FIG. 6 is a flowchart of the restriction rate setting processing shown in FIG. 4.

The request acceptance portion 33 can set a restriction rate Y1 that is an access restriction execution ratio (see FIG. 6). The access restriction is a restriction of access to the database 32. The restriction rate Y1 is expressed in percentage.

The device management system 30 includes a load amount acquisition portion 34 that is an application that acquires a database load amount. The database load amount is a load amount of the database 32. The database load amount is, for example, a DTU (Database Transaction Unit) percentage or Workers percentage in Microsoft Azure.

The device management system 30 includes a cache 35 which stores load amount history information 35a that indicates a history of the database load amount acquired by the load amount acquisition portion 34.

Figure 2:
FIG. 2 is a diagram showing an example of load amount history information shown in FIG. 1.

FIG. 2 is a diagram showing an example of the load amount history information 35a.

As shown in FIG. 2, the load amount history information 35a includes a combination of a date and time on/at which the database load amount has been acquired by the load amount acquisition portion 34 and the database load amount, for each of the database load amounts.

As shown in FIG. 1, the computing system 10 further includes at least one web browser 40. For example, the web browser 40 is realized by a computer such as a PC (Personal Computer) (not shown). The user can access the device management system 30 via the web browser 40.

Next, operations of the computing system 10 will be described.

First, operations of the load amount acquisition portion 34 for acquiring the database load amount will be described.

Figure 3:
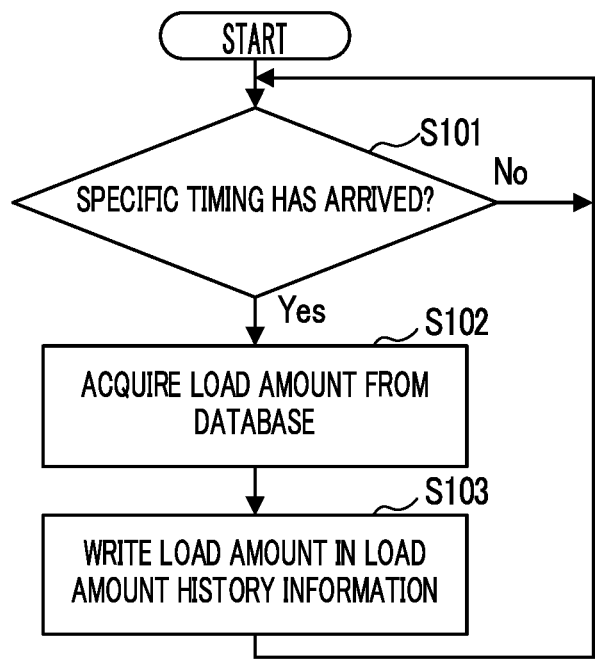
FIG. 3 is a flowchart showing operations of a load amount acquisition portion shown in FIG. 1 for acquiring a database load amount.

FIG. 3 is a flowchart showing the operations of the load amount acquisition portion 34 for acquiring the database load amount.

As shown in FIG. 3, until it is determined that a specific timing has arrived, the load amount acquisition portion 34 determines whether the specific timing has arrived (S101). The specific timing is, for example, a periodic timing such as once every minute.

Upon determining that the specific timing has arrived, the load amount acquisition portion 34 acquires the database load amount from the database 32 (S102).

Upon ending the processing of Step S102, the load amount acquisition portion 34 writes the database load amount acquired in Step S102 in the load amount history information 35a (S103).

Upon ending the processing of Step S103, the load amount acquisition portion 34 executes the processing of Step S101.

Next, operations of the computing system 10 in a case where the device 20 transmits a connection request to the device management system 30 will be described.

Figure 4:
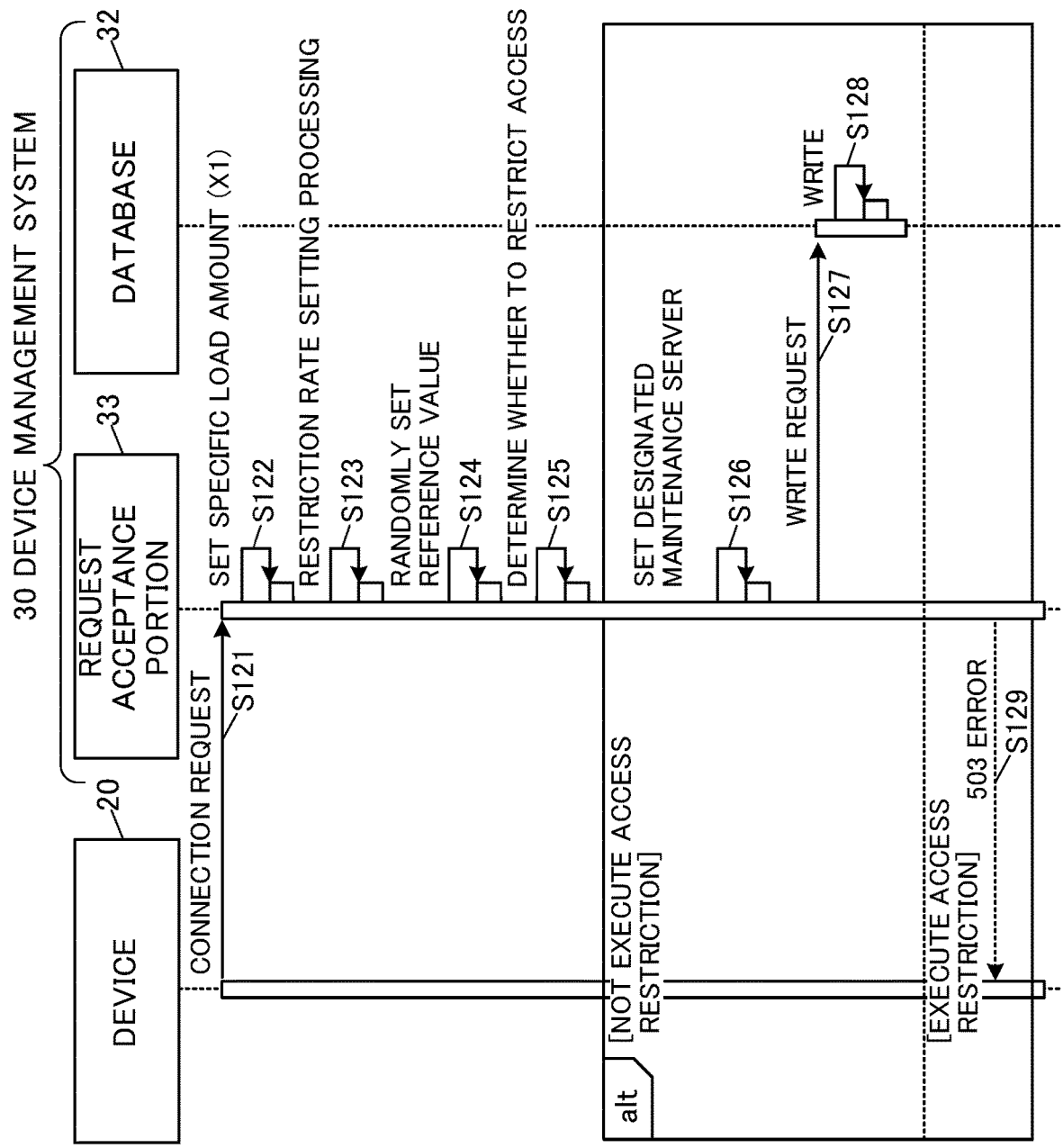
FIG. 4 is an operational sequence diagram of the system shown in FIG. 1 in a case where a device transmits a connection request to a device management system.

FIG. 4 is an operational sequence diagram of the computing system 10 in the case where the device 20 transmits a connection request to the device management system 30.

As shown in FIG. 4, the device 20 transmits a connection request to the request acceptance portion 33 of the device management system 30 (S121). For example, the device 20 transmits the connection request when a connection with the device management system 30 is cut off due to a problem on the device management system 30 side. As will be described later, the device 20 may retransmit the connection request.

The request acceptance portion 33 receives the connection request transmitted from the device 20 in Step S121 and sets a specific load amount X1 (S122). The specific load amount X1 is the database load amount used for setting the restriction rate Y1. The request acceptance portion 33 sets the specific load amount X1 based on the database load amount written in the load amount history information 35a.

For example, the request acceptance portion 33 sets, as the specific load amount X1, the latest database load amount written in the load amount history information 35a.

Upon ending the processing of Step S122, the request acceptance portion 33 executes restriction rate setting processing (S123). The restriction rate setting processing is processing of setting the restriction rate Y1 using the specific load amount X1 set in Step S122.

FIG. 5 is a diagram showing an example of values of respective parameters used in the restriction rate setting processing in Step S123.

As shown in FIG. 5, the parameters include, for example, a first lower limit value L1, a second lower limit value L2, a first coefficient K1, a second coefficient K2, a first constant C1, and a second constant C2.

The first lower limit value L1 is a lower limit value of the specific load amount X1 in a case where the restriction rate Y1 is larger than 0% and smaller than 100%. The second lower limit value L2 is a lower limit value of the specific load amount X1 in a case where the restriction rate Y1 is 100%.

In descriptions below, a range that is equal to or larger than the first lower limit value L1 and smaller than the second lower limit value L2 will be referred to as a reference range.

The first coefficient K1 is a coefficient used for adjusting the restriction rate Y1 in a case where the specific load amount X1 exists in a first half of the reference range. The second coefficient K2 is a coefficient used for adjusting the restriction rate Y1 in a case where the specific load amount X1 exists in a latter half of the reference range.

The first constant C1 is a constant added when setting the restriction rate Y1 in the case where the specific load amount X1 exists in the first half of the reference range. The second constant C2 is a constant added when setting the restriction rate Y1 in the case where the specific load amount X1 exists in the latter half of the reference range.

In the example shown in FIG. 5, the first lower limit value L1 is 40%, the second lower limit value L2 is 80%, the first coefficient K1 is 0.5, the second coefficient K2 is 0.7, the first constant C1 is 5%, and the second constant C2 is 10%. An administrator who manages the device management system 30 is capable of changing the values of the respective parameters shown in FIG. 5 in the device management system 30.

FIG. 6 is a flowchart showing the restriction rate setting processing in Step S123. For example, the parameters shown in FIG. 5 are used in the restriction rate setting processing. It is noted that the parameters that differ in types or values from the content shown in FIG. 5 may be used instead. Alternatively, the restriction rate setting processing may be executed in the order different from that of the flowchart shown in FIG. 6.

As shown in FIG. 6, the request acceptance portion 33 determines whether the specific load amount X1 set in Step S122 is smaller than the first lower limit value L1 (S141).

When determining that the specific load amount X1 is smaller than the first lower limit value L1, the request acceptance portion 33 sets the restriction rate Y1 to 0% (S142).

When determining that the specific load amount X1 is equal to or larger than the first lower limit value L1, the request acceptance portion 33 determines whether the specific load amount X1 exists in the first half of the reference range (S143). In the example shown in FIG. 5, the first half of the reference range is a range of 40% or more and smaller than 60%. It is noted that a threshold value M1 between the first half and latter half of the reference range is half of a sum of the first lower limit value L1 and the second lower limit value L2.

Upon determining that the specific load amount X1 exists in the first half of the reference range, the request acceptance portion 33 sets the restriction rate Y1 corresponding to the specific load amount X1 (S144). At that time, the request acceptance portion 33 sets, as the restriction rate Y1, a value obtained by adding the first constant C1 to a product of the specific load amount X1 and the first coefficient K1.

Upon determining that the specific load amount X1 does not exist in the first half of the reference range, the request acceptance portion 33 determines whether the specific load amount X1 exists in the latter half of the reference range (S145). In the example shown in FIG. 5, the latter half of the reference range is a range of 60% or more and smaller than 80%.

Upon determining that the specific load amount X1 exists in the latter half of the reference range, the request acceptance portion 33 sets the restriction rate Y1 corresponding to the specific load amount X1 (S146). Specifically, the request acceptance portion 33 sets, as the restriction rate Y1, a value obtained by adding the second constant C2 to a product of the specific load amount X1 and the second coefficient K2.

On the other hand, upon determining that the specific load amount X1 does not exist in the reference range, the request acceptance portion 33 sets the restriction rate Y1 to 100% (S147).

Upon ending the processing of Step S142, Step S144, Step S146, or Step S147, the request acceptance portion 33 ends the operations shown in FIG. 6.

Figure 7:
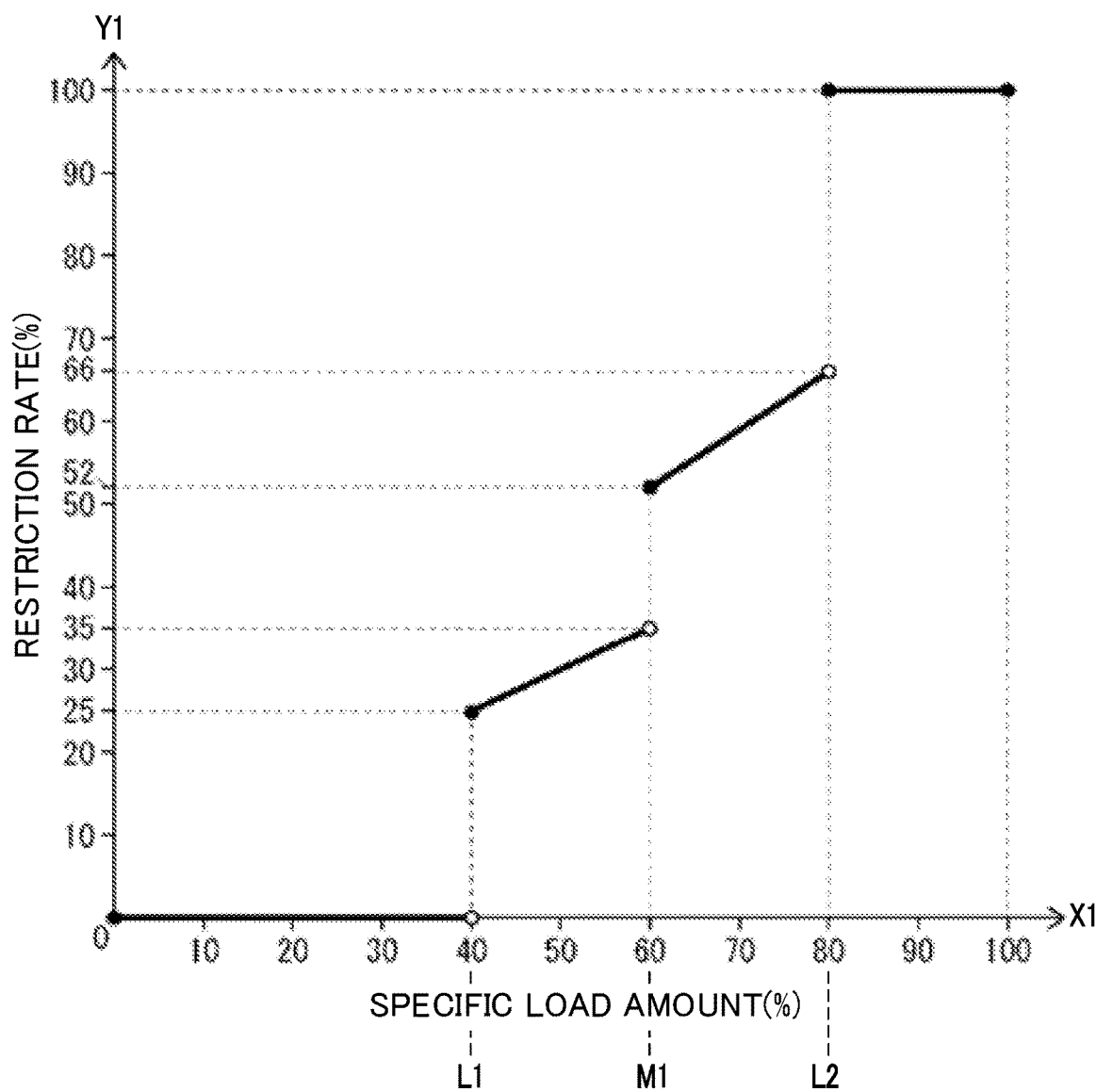
FIG. 7 is a diagram showing a relationship between a specific load amount set by the processing shown in FIG. 4 and a restriction rate set by the restriction rate setting processing shown in FIG. 6.

FIG. 7 is a diagram showing a relationship between the specific load amount X1 set in Step S122 and the restriction rate Y1 set by the restriction rate setting processing shown in FIG. 6.

As shown in FIG. 7, when the specific load amount X1 is smaller than the first lower limit value L1, the restriction rate Y1 is 0%. When the specific load amount X1 is equal to or larger than the first lower limit value L1 and smaller than the threshold value M1, the restriction rate Y1 is a value obtained by adding the first constant C1 to the product of the specific load amount X1 and the first coefficient K1. When the specific load amount X1 is equal to or larger than the threshold value M1 and smaller than the second lower limit value L2, the restriction rate Y1 is a value obtained by adding the second constant C2 to the product of the specific load amount X1 and the second coefficient K2. When the specific load amount X1 is equal to or larger than the second lower limit value L2, the restriction rate Y1 is 100%.

As shown in FIG. 4, upon ending the restriction rate setting processing in Step S123, the request acceptance portion 33 randomly sets one reference value that is an integer of 0 or more and 100 or less (S124). Here, the request acceptance portion 33 may set the reference value using a random number function or a random number table.

Upon ending the processing of Step S124, the request acceptance portion 33 determines whether to execute the access restriction based on the restriction rate Y1 set in Step S123 and the reference value (S125).

Specifically, the request acceptance portion 33 determines not to execute the access restriction when the reference value is larger than the restriction rate Y1. On the other hand, the request acceptance portion 33 determines to execute the access restriction when the reference value is equal to or smaller than the restriction rate Y1.

For example, when the reference value is 75 and the restriction rate Y1 is 70, the request acceptance portion 33 determines not to execute the access restriction. On the other hand, when the reference value is 65 and the restriction rate Y1 is 70, the request acceptance portion 33 determines to execute the access restriction.

When determining not to execute the access restriction, the request acceptance portion 33 sets a designated maintenance server which is the remote maintenance server 31 that the device 20 that has transmitted the connection request in Step S121 is to access (S126).

Next, the request acceptance portion 33 requests the database 32 to register data that specifies the designated maintenance server set in Step S126 (S127). In this manner, the connection request transmitted by the device 20 in Step S121 is a request for causing the request acceptance portion 33 to execute access to the database 32. The processing of Step S127 is an example of processing of permitting access to the database 32.

Upon receiving the request in Step S127, the database 32 retains data that specifies the designated maintenance server corresponding to the request of Step S127 (S128).

Upon determining to execute the access restriction in Step S125, the request acceptance portion 33 notifies the device 20 of a 503 error that indicates that the connection request transmitted in Step S121 cannot be processed (S129). The 503 error represents Service Unavailable.

Next, operations of the device 20 for retransmitting the connection request will be described.

Figure 8:
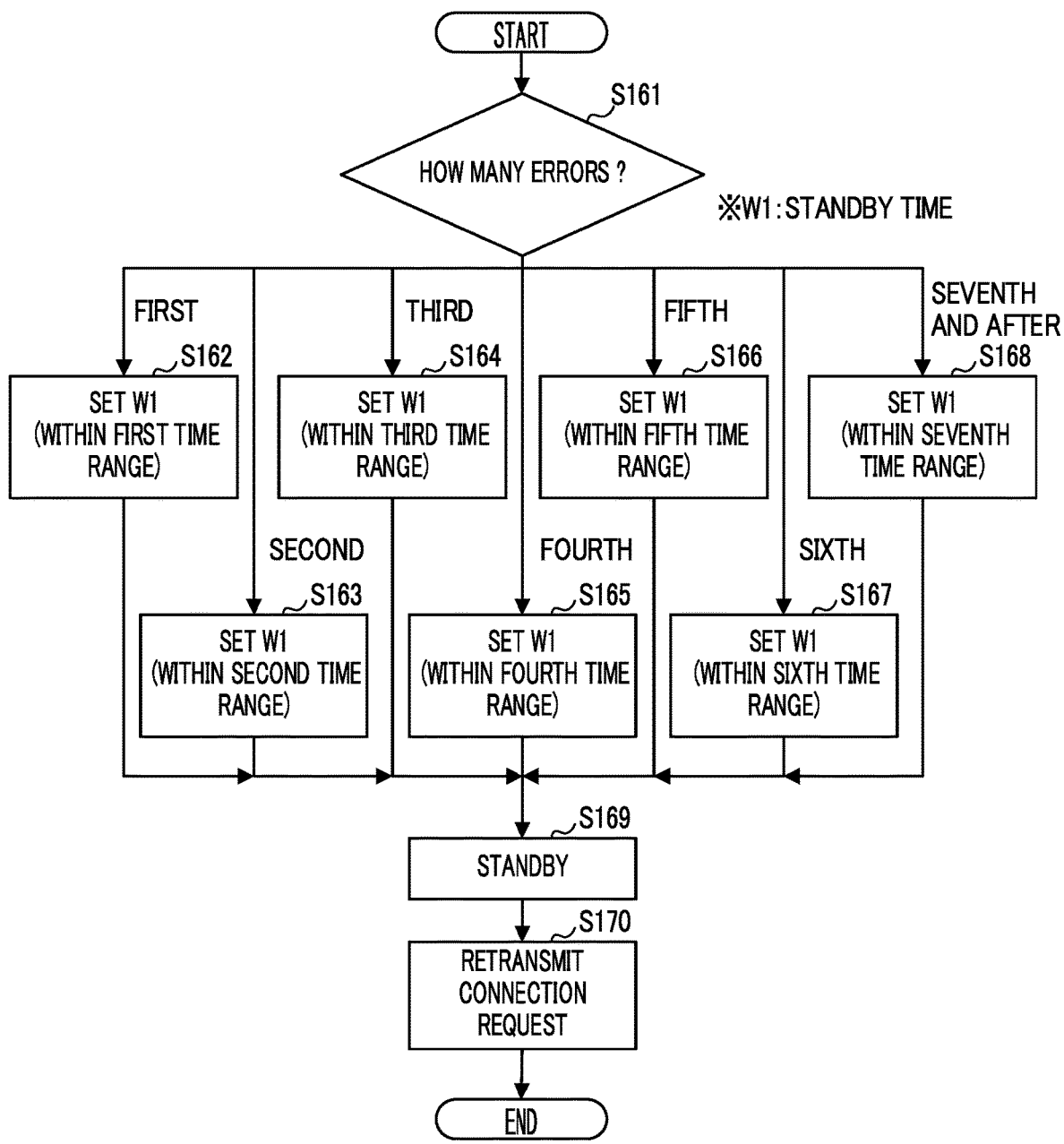
FIG. 8 is a flowchart showing operations of the device shown in FIG. 1 when retransmitting a connection request.

FIG. 8 is a flowchart showing the operations of the device 20 for retransmitting the connection request.

Upon being notified of the 503 error by the request acceptance portion 33 in Step S129, the device 20 executes the operations shown in FIG. 8.

As shown in FIG. 8, the device 20 determines how many 503 errors have been notified with respect to the connection request in Step S129 (S161).

Upon determining that the 503 error is a first 503 error with respect to the connection request, the device 20 randomly sets a standby time W1 within a first time range (S162). For example, the device 20 randomly sets a standby coefficient from 0.7 to 1.3, and sets a product of one minute and the standby coefficient as the standby time W1. In this case, the first time range is a range from 0.7 minutes to 1.3 minutes.

Upon determining that the 503 error is a second 503 error with respect to the connection request, the device 20 randomly sets the standby time W1 within a second time range (S163). For example, the device 20 randomly sets the standby coefficient from 0.7 to 1.3, and sets a product of two minutes and the standby coefficient as the standby time W1. In this case, the second time range is a range from 1.4 minutes to 2.6 minutes.

Upon determining that the 503 error is a third 503 error with respect to the connection request, the device 20 randomly sets the standby time W1 within a third time range (S164). For example, the device 20 randomly sets the standby coefficient from 0.7 to 1.3, and sets a product of four minutes and the standby coefficient as the standby time W1. In this case, the third time range is a range from 2.8 minutes to 5.2 minutes.

Upon determining that the 503 error is a fourth 503 error with respect to the connection request, the device 20 randomly sets the standby time W1 within a fourth time range (S165). For example, the device 20 randomly sets the standby coefficient from 0.7 to 1.3, and sets a product of eight minutes and the standby coefficient as the standby time W1. In this case, the fourth time range is a range from 5.6 minutes to 10.4 minutes.

Upon determining that the 503 error is a fifth 503 error with respect to the connection request, the device 20 randomly sets the standby time W1 within a fifth time range (S166). For example, the device 20 randomly sets the standby coefficient from 0.7 to 1.3, and sets a product of 16 minutes and the standby coefficient as the standby time W1. In this case, the fifth time range is a range from 11.2 minutes to 20.8 minutes.

Upon determining that the 503 error is a sixth 503 error with respect to the connection request, the device 20 randomly sets the standby time W1 within a sixth time range (S167). For example, the device 20 randomly sets the standby coefficient from 0.7 to 1.3, and sets a product of 32 minutes and the standby coefficient as the standby time W1. In this case, the sixth time range is a range from 22.4 minutes to 41.6 minutes.

Upon determining that the 503 error is a seventh 503 error with respect to the connection request, the device 20 randomly sets the standby time W1 within a seventh time range (S168). For example, the device 20 randomly sets the standby coefficient from 0.7 to 1.3, and sets a product of 60 minutes and the standby coefficient as the standby time W1. In this case, the seventh time range is a range from 42 minutes to 78 minutes.

Upon ending the processing of any of Step S162 to Step S168, the device 20 stands by for the set standby time W1 (S169).

Upon ending the processing of Step S169, the device 20 retransmits, to the request acceptance portion 33, the connection request as a target of the 503 error notified by the request acceptance portion 33 in Step S129 (S170).

Upon ending the processing of Step S170, the device 20 ends the operations shown in FIG. 8.

Figure 9:
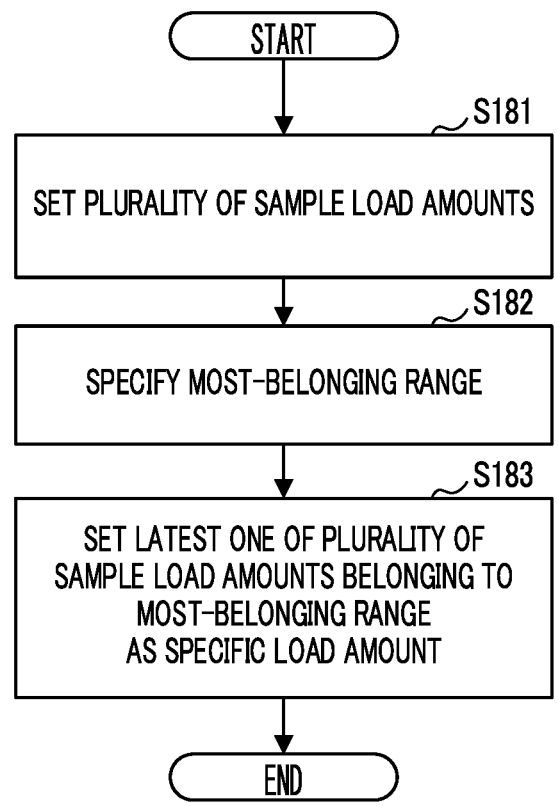
FIG. 9 is a flowchart showing operations of a request acceptance portion shown in FIG. 1 when setting a specific load amount.

It is noted that in Step S122 shown in FIG. 4, a method shown in FIG. 9 may be adopted as the method of setting the specific load amount X1.

FIG. 9 is a flowchart showing operations of the request acceptance portion 33 for setting the specific load amount X1.

As shown in FIG. 9, the request acceptance portion 33 specifies, as a plurality of sample load amounts, a specific number of latest load amounts out of the database load amounts included in the load amount history information 35a (S181). The number of the plurality of sample load amounts is, for example, 5.

Upon ending the processing of Step S181, the request acceptance portion 33 specifies a most-belonging range where the plurality of sample load amounts belong most among four predetermined specific ranges (S182). The four specific ranges are each a range of the load amount.

In the present embodiment, the four specific ranges include a range smaller than the first lower limit value L1, a range of the first half of the reference range, a range of the latter half of the reference range, and a range equal to or larger than the second lower limit value L2.

Upon ending the processing of Step S182, the request acceptance portion 33 sets, as the specific load amount X1, a latest one of the plurality of sample load amounts belonging to the most-belonging range (S183).

Upon ending the processing of Step S183, the request acceptance portion 33 ends the operations shown in FIG. 9.

As described above, in the device management system 30, when the connection request is accepted from the device 20, the request acceptance portion 33 sets the restriction rate Y1 according to the database load amount (S123). Further, the request acceptance portion 33 selectively executes, by a ratio corresponding to the restriction rate Y1, the processing of permitting access to the database 32 and the processing of not permitting access to the database 32 and notifying the device 20 of the 503 error (S124 to S129).

By adopting the device management system 30, a possibility that the number of accesses to the database 32 will increase when the request acceptance portion 33 accepts the connection request from many devices 20 within a short time is lowered. As a result, a load of the database 32 can be reduced. Therefore, the device management system 30 can lower the necessity of scaling up and scaling out the database 32. By adopting the device management system, the possibility that the number of accesses to the database will increase is lowered, and the load of the database is reduced.

Since the device management system 30 can reduce the load of the database 32, performance of functions that use the database 32 among the functions of the device management system 30 can be improved. For example, the device management system 30 can improve performance of functions by which the database 32 is used from the web browser 40 outside the device management system 30.

In the device management system 30, the load amount acquisition portion 34 repetitively acquires the database load amount from the database 32 at a timing that does not depend on a timing at which the request acceptance portion 33 accepts the connection request from the device 20 (S101 to S103). Thus, the load amount acquisition portion 34 accumulates the plurality of sample load amounts. The request acceptance portion 33 sets the restriction rate Y1 according to the plurality of sample load amounts (S122 to S123).

Therefore, in the request acceptance portion 33, a possibility that the processing of accepting the connection request and the processing of acquiring the database load amount from the database 32 will become intense during a short time is lowered. As a result, the load of the database 32 can be reduced.

For example, the request acceptance portion 33 specifies the most-belonging range where the plurality of sample load amounts belong most out of the plurality of specific ranges that are each a range of the database load amount (S182). In this case, the request acceptance portion 33 sets the restriction rate Y1 according to the latest one of the plurality of sample load amounts belonging to the most-belonging range (S183 and S123).

In the above-described case, when the latest database load amount temporarily takes an anomalous value, the restriction rate Y1 is set according to one sample load amount other than the anomalous value, that is specified from the plurality of sample load amounts. As a result, a situation where the device is notified of the 503 error based on the anomalous value is avoided. Consequently, a possibility that the load of the database 32 can be appropriately reduced can be raised.

In the computing system 10, the device 20 retransmits the connection request when notified of the 503 error by the request acceptance portion 33 (S170). By the retransmission of the connection request, a possibility that the connection request will be appropriately processed in the device management system 30 is raised.

In the computing system 10, the device 20 randomly sets the standby time W1 required before the connection request is retransmitted since the notification of the 503 error (S161 to S168). In this case, a possibility that the retransmissions of the connection requests by the plurality of devices 20 will become intense during a short time is lowered.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A device management system which manages a device, comprising:
    a database;
    a request acceptance portion which accepts a connection request from the device; and
    a load amount acquisition portion which repetitively acquires a load amount of the database from the database at a timing that does not depend on a timing at which the request acceptance portion accepts the connection request from the device, to accumulate a plurality of sample load amounts, wherein
    the connection request is a request for causing the request acceptance portion to execute access to the database,
    when the connection request is accepted from the device, the request acceptance portion sets a restriction rate according to the load amount of the database and selectively executes, by a ratio corresponding to the restriction rate, processing of permitting access to the database and processing of not permitting access to the database and notifying the device of an error, and
    the request acceptance portion sets the restriction rate according to the plurality of sample load amounts.

2. The device management system according to claim 1, wherein
    the request acceptance portion specifies a most-belonging range where the plurality of sample load amounts belong most among a plurality of specific ranges which are each a range of the load amount, and sets the restriction rate according to a latest one of the plurality of sample load amounts belonging to the most-belonging range.

3. A computing system, comprising:
    a device; and
    a device management system which manages the device, wherein
    the device management system includes
    a database, and
    a request acceptance portion which accepts a connection request from the device,
    the connection request is a request for causing the request acceptance portion to execute access to the database,
    when the connection request is accepted from the device, the request acceptance portion sets a restriction rate according to a load amount of the database and selectively executes, by a ratio corresponding to the restriction rate, processing of permitting access to the database and processing of not permitting access to the database and notifying the device of an error,
    the device retransmits the connection request to the request acceptance portion upon being notified of the error by the request acceptance portion, and
    the device randomly sets a standby time required before the connection request is retransmitted since the notification of the error.

* * * * *